W. A. NEWMAN.
VEHICLE BED.
APPLICATION FILED FEB. 27, 1919.
1,311,177.
Patented July 29, 1919.
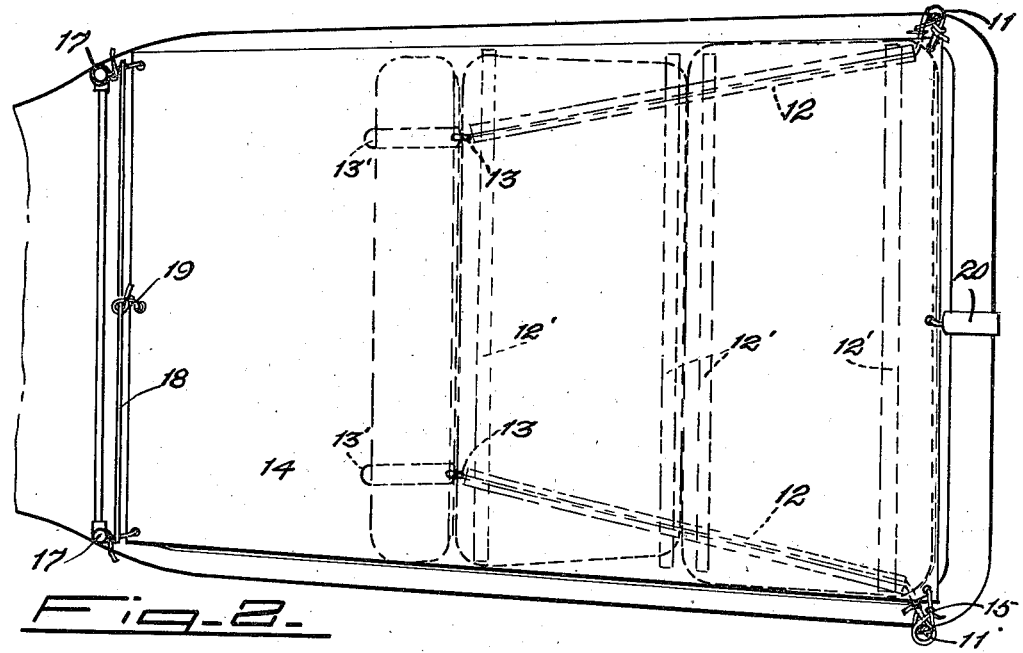
Fig. 2.
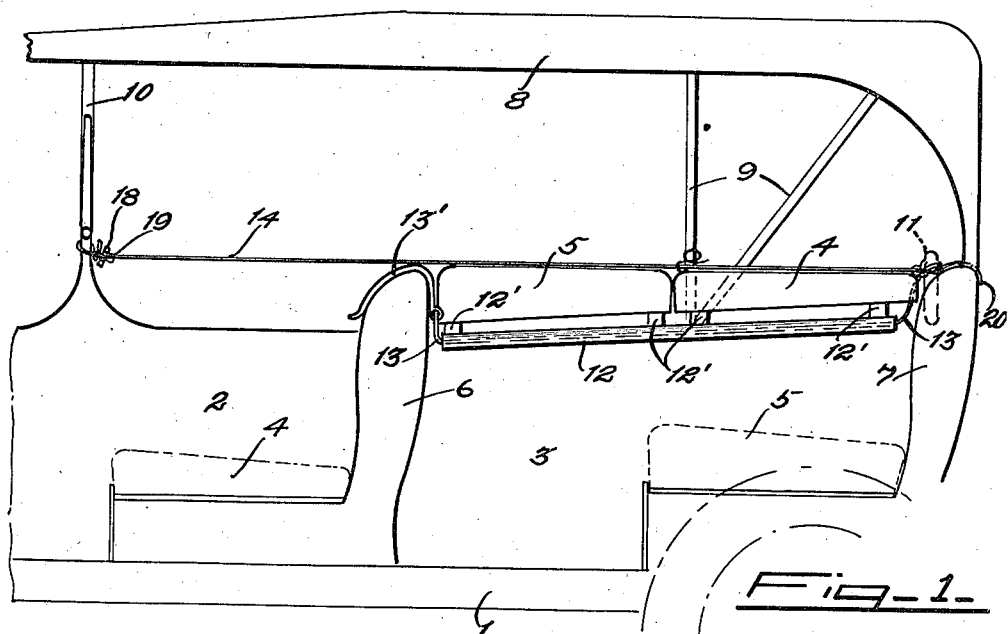
Fig. 1.
Fig. 3.
WITNESS:
Wm. F. Drew
INVENTOR.
William A. Newman
BY
Acker & Tollen
ATTORNEYS.

UNITED STATES PATENT OFFICE.

WILLIAM A. NEWMAN, OF OAKLAND, CALIFORNIA.

VEHICLE-BED.

1,311,177.   Specification of Letters Patent.   Patented July 29, 1919.

Application filed February 27, 1919. Serial No. 279,628.

*To all whom it may concern:*

Be it known that I, WILLIAM A. NEWMAN, a citizen of the United States, residing at Oakland, in the county of Alameda and State of California, have invented certain new and useful Improvements in Vehicle-Beds, of which the following is a specification.

This invention relates to improvements in beds, and more particularly to a full size bed designed for use in connection with automobile bodies.

The principal object of the invention is to provide a construction of this type which will permit the utilization of the vehicle cushions in the forming of the major portion or body supporting portion of the bed. A further object is to provide a construction wherein the cushion supporting means is capable of adjustment to position the upper surfaces of the cushions substantially level with the top of the back of the front vehicle seat, thereby providing a structure which is adapted for use in connection with vehicles where the seats are of various shapes and thicknesses. A further object is to provide a fabric spread maintained stretched over the assembled cushions and extending over the front seating compartment, thereby providing a support for the pedal extremities of the bed occupants. A further object is to leave the front and rear compartments of the vehicle underneath the suspended frame work free of any obstruction so that they may be leveled and made available for sleeping purposes for children or for storage. All of the above objects being obtained without cutting or altering any portion of the vehicle as produced by the manufacturer.

With the above mentioned and other objects in view, the invention consists in the novel construction and combination of parts hereinafter described, illustrated in the accompanying drawings and pointed out in the claims hereto appended; it being understood that various changes in the form, proportion, size, and minor details of construction within the scope of the claim may be resorted to without departing from the spirit or sacrificing any of the advantages of the invention.

To more fully comprehend the invention, reference is directed to the accompanying drawings, wherein—

Figure 1 is a view in side elevation of a vehicle illustrating the preferred embodiment of my invention employed in connection therewith.

Fig. 2 is a view in top plane.

Fig. 3 is a small detail view of the position of the central supporting members when the same are positioned to maintain the upper surface of the seats level when said seats have beveled undersurfaces.

Referring more particularly to the drawings, wherein like characters of reference designate corresponding parts, 1 indicates a vehicle body, preferably of the touring type, and having the front compartment 2 and rear compartment 3, the front being provided with the usual seat 4 and the rear provided with the usual seat 5. The front seat is provided with a vertical back 6 and a back 7 is provided for the rear seat 5.

It is preferable to provide a top or canopy 8 for covering the vehicle, the same being supported at its rear by the bows 9 and at its front end preferably by resting on the wind-shield 10. The bows 9, when the top is in lowered or collapsed position, are preferably supported by the irons 11.

When it is desired to utilize the seat cushions 4 and 5 in the forming of a bed, the same are removed from the compartments 2 and 3 and a supporting frame is stretched between the irons 11 and the top of the back of the front seat, said frame consisting of the tubular members 12 through which pass the flexible members 13 preferably in the form of a cable, the rear end of the flexible members being preferably tied or otherwise secured to the irons 11 and the front of said members employ suitable hooks 13' for resting on the top of the back of the front seat. The tubular members 12 being freely slidable on the members 13, permit of the positioning of the frame forming members at the proper angle and at the required height to maintain the upper surface of the seat cushions in substantially horizontal alinement with the top of the back of the front seat.

Suitable transverse members 12' rest on the tubular members 12, and on the same are positioned the seat cushions 4 and 5, the upper surface of which is in a line substantially parallel with the top of the back of the front seat.

To prevent the suspended frame-work swinging either to the side or longitudinally to increase the width of the bed (over the length of the cushions) to that of the width between the side curtains; to provide a support for the pedal extremities and also to form a cover for the cushions, a suitable fabric member 14, preferably of light canvas, extends over the front and rear compartments 2 and 3, the rear corners of said fabric being tied or otherwise secured, as at 15, to the irons 11, and the front corner members being tied or otherwise secured, as at 16, to the uprights 17 of the windshield 10.

To prevent the sagging of the front end of the member 14, a spreader bar or strut 18, forked at its opposite ends, is positioned between the securing members 16 and is tied in position as at 19.

If desirable, a hook or other member 20 may be secured to the center of the rear edge of the member 14 and passed upwardly over the top of the rear seat back to prevent sagging of the rear edge of the member 14. Should future designs of vehicle builders omit the irons 11, the flexible members 13 may be secured to the nearest available fastening such as a spare tire holder or vehicle springs.

In Fig. 3, I have illustrated the central transverse members 12' of the frame set on edge when it is desired to maintain the upper surfaces of seat cushions, having inclined underfaces, level.

My construction is capable of being quickly set up and taken down when desired, and of being stored in very small space when not in use.

Having thus described my invention, what I claim as new and desire to protect by Letters Patent is:—

In a bed for a vehicle, a plurality of supports secured at their opposite ends to the vehicle structure to extend longitudinally from the front to the rear of the rear vehicle compartment and each comprising a flexible member of a length greater than the depth from front to rear of said rear vehicle compartment, a tubular rigid member surrounding each of said flexible members and adjustable longitudinally thereof, said rigid members each being of a length slightly less than the depth from front to rear of said rear vehicle compartment, and a plurality of cushions extending across said supports and mounted on said rigid members, the longitudinal adjustment of said rigid members on said flexible members maintaining the upper surfaces of said cushions in a substantially horizontal plane in a line substantially level with the upper edge of the front seat back.

In testimony whereof I have signed my name to this specification in the presence of a subscribing witness.

WILLIAM A. NEWMAN.

Witness:
D. B. RICHARDS.